US010766377B2

(12) United States Patent
Jung et al.

(10) Patent No.: US 10,766,377 B2
(45) Date of Patent: Sep. 8, 2020

(54) CHARGING DEVICE, CHARGING MANAGEMENT SERVER, AND CHARGING METHOD

(71) Applicants:Hyundai Motor Company, Seoul (KR); Kia Motors Corporation, Seoul (KR); Yura Corporation Co., Ltd., Seongnam-si (KR)

(72) Inventors: Yun Jae Jung, Suwon-si (KR); Sohyun Jang, Seoul (KR); Daehwan Kwon, Seongnam-si (KR)

(73) Assignees: Hyundai Motor Company, Seoul (KR); Kia Motors Corporation, Seoul (KR); Yura Corporation Co., Ltd., Seongnam-si (KR)

( * ) Notice: Subject to any disclaimer, the term of this patent is extended or adjusted under 35 U.S.C. 154(b) by 0 days.

(21) Appl. No.: 16/023,471

(22) Filed: Jun. 29, 2018

(65) Prior Publication Data

US 2019/0202305 A1    Jul. 4, 2019

(30) Foreign Application Priority Data

Dec. 28, 2017   (KR) .......................... 10-2017-0182376

(51) Int. Cl.
*B60L 53/16*   (2019.01)
*B60L 53/66*   (2019.01)
*G06Q 30/02*   (2012.01)
*B60L 58/12*   (2019.01)
*H04W 4/80*    (2018.01)

(52) U.S. Cl.
CPC ............. *B60L 53/665* (2019.02); *B60L 53/16* (2019.02); *B60L 58/12* (2019.02); *G06Q 30/0283* (2013.01); *H04W 4/80* (2018.02)

(58) Field of Classification Search
CPC ..... B60L 58/12; G06Q 30/0283; Y04S 30/12; Y04S 30/14; H04W 4/80
See application file for complete search history.

(56) References Cited

U.S. PATENT DOCUMENTS

| 10,070,265 | B1* | 9/2018 | Maricic | ................... H04L 67/02 |
| 2011/0099144 | A1* | 4/2011 | Levy | ...................... B60L 53/30 |
| | | | | 707/609 |
| 2013/0046660 | A1* | 2/2013 | Lowenthal | ............. G06Q 30/04 |
| | | | | 705/30 |
| 2014/0232327 | A1* | 8/2014 | Hasegawa | ............. H02J 7/0027 |
| | | | | 320/107 |

(Continued)

*Primary Examiner* — Richard Isla
*Assistant Examiner* — Johali A Torres Ruiz
(74) *Attorney, Agent, or Firm* — Morgan, Lewis & Bockius LLP

(57) ABSTRACT

A charging device and method for controlling the same may include a charging connector connectable to a vehicle; a power connector connectable to a power source; a communication module configured to receive beacon signals from a plurality of beacons and send beacon information included in the received beacon signals to a charging management server; and a controller configured to, upon reception of a charging authorization signal from the charging management server, charge the vehicle connected to the charging connector and control the communication module to send information related to an amount of power used for charging the vehicle to the charging management server.

22 Claims, 11 Drawing Sheets

(56) References Cited

U.S. PATENT DOCUMENTS

| | | | |
|---|---|---|---|
| 2014/0289082 A1* | 9/2014 | Seo | G06Q 30/04 |
| | | | 705/34 |
| 2016/0358472 A1* | 12/2016 | Bezak | B60L 53/30 |
| 2017/0063126 A1* | 3/2017 | Haebler | G01R 21/133 |
| 2017/0164179 A1* | 6/2017 | Jeon | H04W 76/11 |

* cited by examiner

CHARGING DEVICE, CHARGING MANAGEMENT SERVER, AND CHARGING METHOD

CROSS-REFERENCE TO RELATED APPLICATION

The present application claims priority to Korean Patent Application No. 10-2017-0182376 filed on Dec. 28, 2017, in the Korean Intellectual Property Office, the entire contents of which is incorporated herein for all purposes by this reference.

BACKGROUND OF THE INVENTION

Field of the Invention

The present invention relates to a charging device configured for charging vehicles driven with electrical energy, charging management server for managing charging of the vehicle, and charging method.

Description of Related Art

Recent concern about depletion of petroleum resources and global warming due to greenhouse gases has led to active research and development on eco-friendly vehicles.

The eco-friendly vehicles emit less amount of air pollutants or carbon dioxide and have good fuel efficiency as compared with the conventional internal combustion engine vehicles, and include hybrid electric vehicles driven with a combination of engine and motor power, plug-in hybrid electric vehicles driven with the combination of engine and motor power while receiving electrical energy to drive the motor from an external power source, electric vehicles driven by an electric motor that receives electrical energy from a high-voltage battery provided in the vehicle without using fossil fuels, fuel cell electric vehicles using fuel cells that generate electricity by making hydrogen react with oxygen in the air, etc.

It is essential for the plug-in hybrid vehicle that receives electrical energy from an external power source and the electric vehicle, to charge their batteries for driving. Accordingly, a convenient battery charging infrastructure is required for commercialization of the plug-in hybrid vehicle or the electric vehicle. Furthermore, proper billing systems need to be accompanied to prevent adverse effects of unauthorized use of public electricity.

The information included in this Background of the Invention section is only for enhancement of understanding of the general background of the invention and may not be taken as an acknowledgement or any form of suggestion that this information forms the prior art already known to a person skilled in the art.

BRIEF SUMMARY OF THE INVENTION

Various aspects of the present invention are directed to providing a charging device and method for controlling the same, facilitating a charging management server to determine a correct current location by sending received beacon signals to the charging management server and facilitating a precise bill to be charged by sending information related to an amount of charging to the charging management server after the charging is started.

Various aspects of the present invention are directed to providing a charging device and charging method, configured for preventing wrong use of public electricity by allowing charging when the use of power at the current location is authorized from a charging management server.

Various aspects of the present invention are directed to providing a charging management server, configured for allowing electric vehicles or plug-in hybrid vehicles to be conveniently charged and preventing unauthorized use of public electricity by determining the current location of a charging device based on beacon signals received from the charging device, guiding the user to a power source available for charging, allowing the user to charge electricity, and charging the user for the charging cost.

In accordance with an aspect of the present invention, a charging device may include a charging connector connectable to a vehicle; a power connector connectable to a power source; a communication module configured to receive beacon signals from a plurality of beacons and send beacon information included in the received beacon signals to a charging management server; and a controller configured to, upon reception of a charging authorization signal from the charging management server, charge the vehicle connected to the charging connector and control the communication module to send information related to an amount of power used for charging the vehicle to the charging management server.

The controller may be configured to measure an amount of power used for charging the vehicle.

The communication module may be configured to send a charging completion signal to the charging management server when charging of the vehicle is completed.

The communication module may be configured to send a charging completion signal and information related to a total amount of power used for charging to the charging management server when charging of the vehicle is completed.

The controller may be configured to determine that charging is completed when information related to a state of charge (SOC) received from the vehicle indicates that charging a battery of the vehicle is completed.

The charging device may further include an input configured to receive information related to an amount of charging or a charging cost from a user.

The controller may be configured to determine whether charging is completed based on the amount of charging or the charging cost input to the input.

The charging device may further include a display configured to display information related to a location of a charging outlet, which is nearest to a current location, when the communication module receives the information related to the location of the charging outlet from the charging management server.

In accordance with another aspect of the present invention, a charging management server may include a communication module configured to receive a plurality of pieces of beacon information from a charging device; and a controller configured to determine a location of the charging device based on the received beacon information, determine whether charging is available based on the location of the charging device, and when it is determined that charging is available, control the communication module to send a charging authorization signal to the charging device.

The controller may be configured to determine that charging is available when the charging device is located adjacent to a charging outlet.

The controller may be configured to control the communication module to send information related to a location of a charging outlet to the charging device when determining that charging is unavailable.

The controller may be configured to determine a charging cost based on information related to an amount of power used for charging when the communication module receives a charging completion signal and the information related to the amount of power used for charging from the charging device.

The controller may be configured to subtract the charging cost from an electricity bill of an owner of the charging outlet.

The controller may be configured to charge an owner of the vehicle for the charging cost.

The controller may be configured to control the communication module to send information related to a recommended maximum charging current to the charging device when determining that a predetermined number or more of vehicles are currently being charged.

In accordance with the other aspect of the present invention, a charging method may include receiving beacon signals from a plurality of beacons; obtaining a plurality of pieces of beacon information from the beacon signals; sending the plurality of pieces of beacon information to a charging management server; charging a vehicle connected to a charging connector when a charging authorization signal is received from the charging management server; and sending information related to an amount of power used for charging the vehicle to the charging management server.

The charging method may further include measuring an amount of power used for charging the vehicle.

The charging method may further include sending a charging completion signal to the charging management server when charging of the vehicle is completed.

The charging method may further include determining whether charging of the vehicle is completed.

The determining of whether charging of the vehicle is completed may include determining that charging is completed when information related to a state of charge (SOC) received from the vehicle indicates that charging a battery of the vehicle is completed.

The charging method may further include receiving information related to an amount of charging or a charging cost from a user.

The determining of whether charging of the vehicle is completed may include determining whether the charging is completed based on the amount of charging or the charging cost input.

The charging method may further comprise: displaying information related to a location of a charging outlet, which is nearest to a current location, when the information related to the location of the charging outlet is received from the charging management server.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
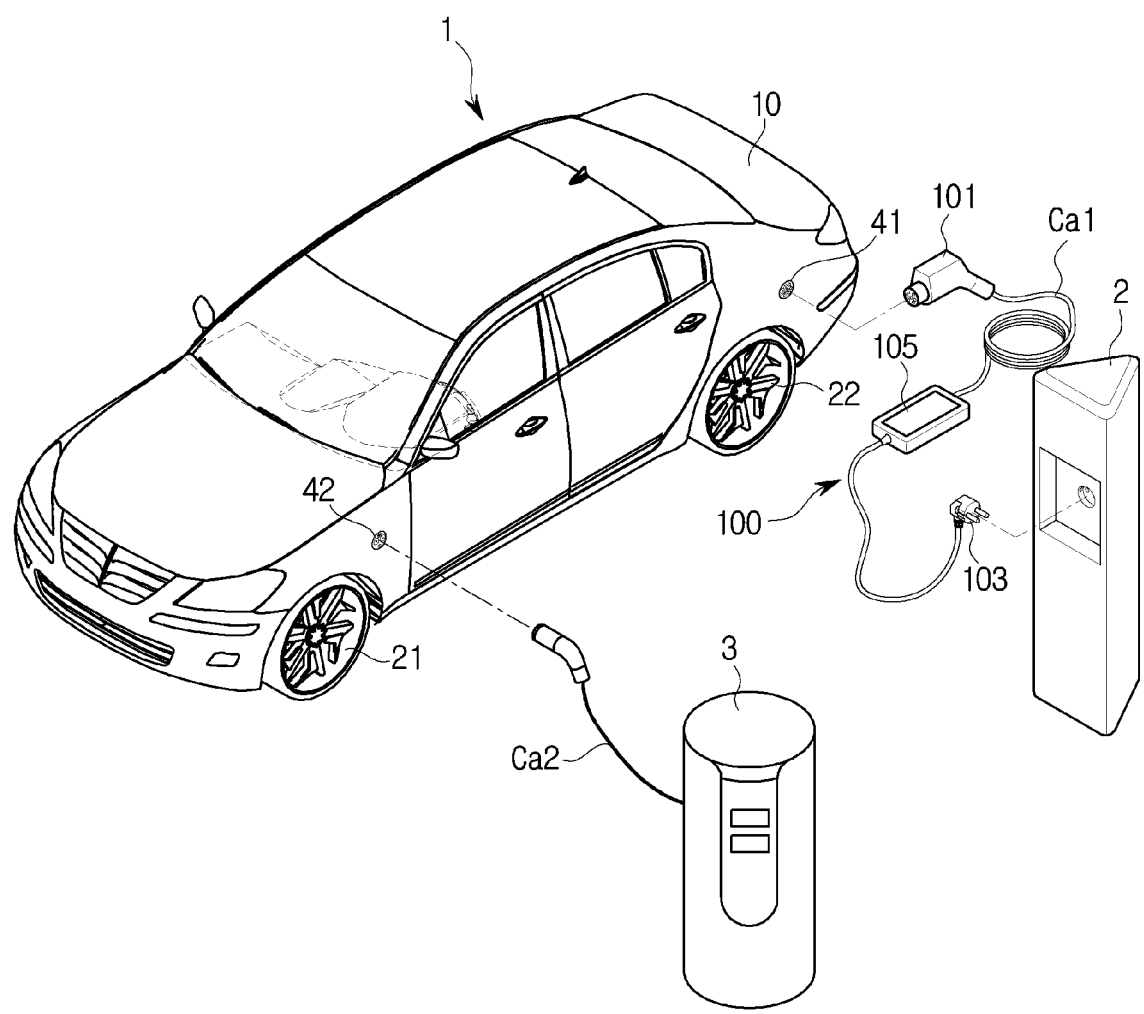
FIG. 1 shows a vehicle being charged by a charging device according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Like numerals refer to like elements throughout the specification. Not all elements of embodiments of the present invention will be described, and description of what are commonly known in the art or what overlap each other in the exemplary embodiments will be omitted.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It is to be understood that the singular forms "a," "an," and "the" include plural references unless the context clearly dictates otherwise.

Furthermore, the terms, such as "~ part", "~ block", "~ member", "~ module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

Reference numerals used for method steps are just used to identify the respective steps, but not to limit an order of the steps. Thus, unless the context clearly dictates otherwise, the written order may be practiced otherwise.

Embodiments of a charging device, charging management server, and charging method will now be described in detail with reference to accompanying drawings.

Figure 2:
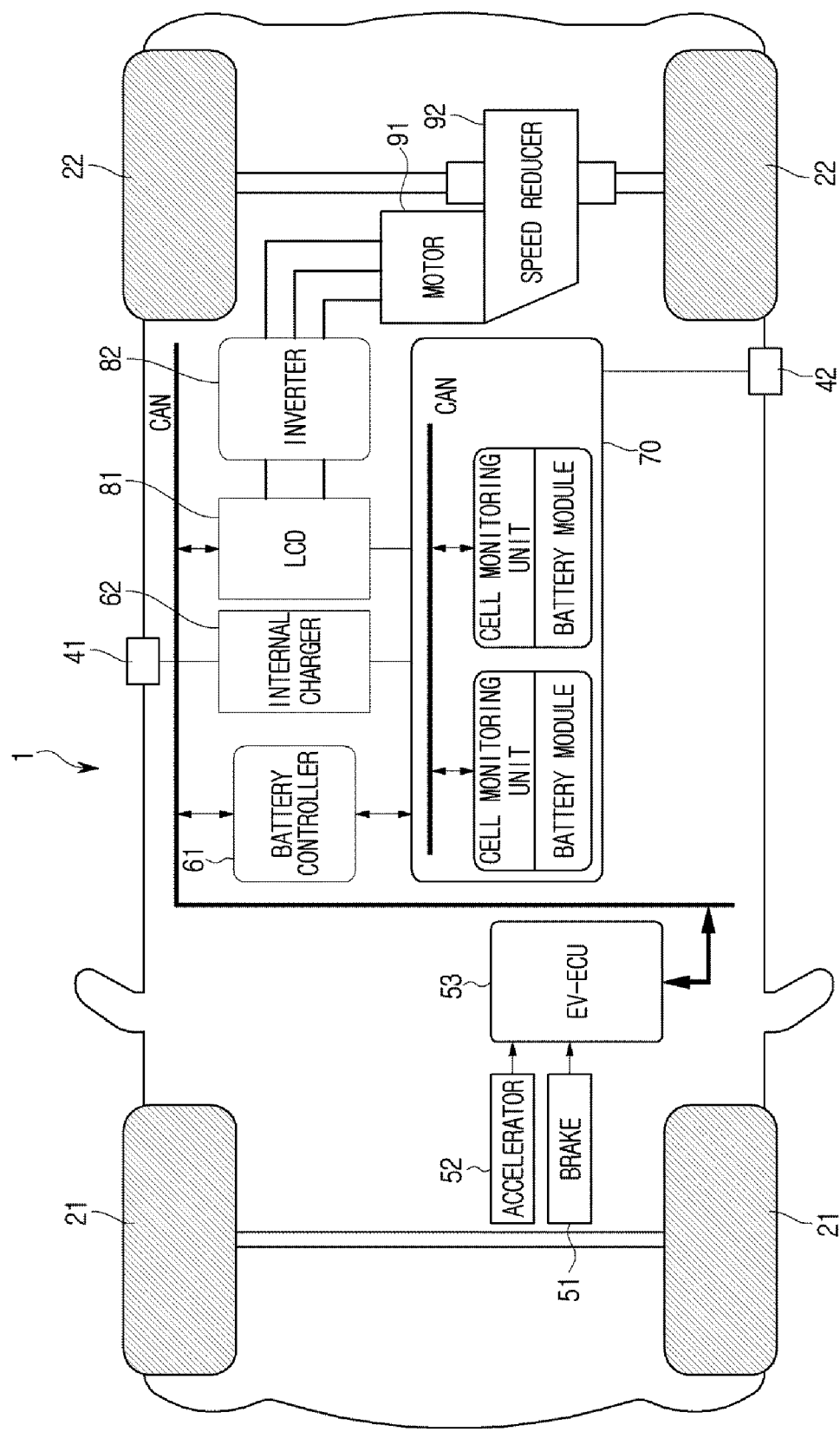
FIG. 2 is a simplified block diagram of a vehicle being charged by a charging device according to an exemplary embodiment of the present invention.

FIG. 1 shows a vehicle being charged by a charging device according to an exemplary embodiment of the present invention, and FIG. 2 is a simplified block diagram of a vehicle being charged by a charging device according to an exemplary embodiment of the present invention.

Vehicles charged by a charging device in accordance with an exemplary embodiment are driven by driving force produced from a motor that receives electrical energy from a battery, the electrical energy stored in the battery being received from an external power source, and may include plug-in hybrid vehicles that use both the engine and the motor as the power generating source and electric vehicles that use only the motor as the power generating source. In the following embodiments, an electric vehicle will be focused for convenience of explanation.

Referring to FIG. 1 and FIG. 2, a motor 91 provided in a vehicle 1 produces driving force by converting electrical energy supplied from a battery 70 to torque and provides the driving force to front wheels 21 or rear wheels 22.

In a case that the vehicle 1 adopts the front-wheel drive system, the motor 91 provides rotational force to the front wheels 21, and in the other case of adopting the rear-wheel drive system, the rotation force is provided to the rear wheels 22. Furthermore, if the vehicle adopts the four-wheel drive system, the rotational force may be provided to both the front wheels 21 and the rear wheels 22.

There are two battery charging types of electric vehicle: slow charging and quick charging. The slow charging type is to slowly charge the battery with a current applied from a common power source, and the quick charging type is to charge the battery within a short time period by applying a high current.

Charging ports 41 and 42 may be provided on a vehicle body 10 to charge the battery 70 by receiving power from an external power source. The charging ports 41 and 42 may include a slow charging port 41 used to receive power from a common power source 2 and a quick charging port 42 used to receive power from an external super charger 3.

Although the charging ports 41 and 42 are shown in FIG. 1 to be on the same side for convenience of explanation, they may be provided on the opposite sides or at least one thereof may be provided on the front side or the rear side of the vehicle depending on the positions, design specifications, etc., of the battery 70 and the motor 91. Alternatively, the charging ports 41 and 42 may be integrated into one unit.

The charging device 100 in accordance with an exemplary embodiment of the present invention may be a slow charging device to charge the vehicle 1 with power supplied from a common power source.

As the regional (national) common power ratings may vary, the power rating for the slow charging may be different according to the region. For example, the charging device 100 may be connected to a common power source to supply alternate current (AC) power of 220 V to the vehicle 1, in which case it may take about 4 to 5 hours to fully charge the battery 70.

As shown in FIG. 1, the charging device 100 may include a main body 105 having a processor and memory embedded therein to perform the following operation and provided with a user interface, a charging cable Ca1 connected to both end portions of the main body 105, a charging connector 101 provided at one end portion of the charging cable Ca1 and connected to the charging port 41, and a power connector 103 provided at the other end portion of the charging cable Ca1 and connected to a power source 2. For example, the power connector 103 may be implemented in a form of a plug to be inserted to a common power outlet.

The super charger 3 may supply direct current (DC) power of about 100 to about 500 V, in which case it will take about 25 minutes to fully charge the battery 70. When a charging cable Ca2 of the super charger 3 is connected to the quick charging port 42 of the vehicle 1, the vehicle 1 may be rapidly charged by receiving power from the super charger 3.

Referring to FIG. 2, a procedure of charging the battery 70 will be described in detail.

The battery 70 of the vehicle 1 may include a secondary battery configured for being repetitively charged and discharged, and may employ e.g., a lithium-ion battery for the secondary battery.

The lithium-ion battery is charged and discharged by a process in which lithium ions are doped and undoped while moving across from anode to cathode.

For charging, lithium is undoped from the anode including lithium-including compounds, and doped between carbon layers of the cathode. For discharging, lithium is undoped from the carbon layers of the cathode and doped between the layers of the compounds of the anode.

Referring to FIG. 2, a plurality of cells is combined by a single frame into a battery module, and a plurality of battery modules may form the single battery 70. The battery 70 comprised of the plurality of battery modules may be referred to as a battery pack.

Furthermore, there may be a cell monitoring device provided to initiate discharging as required by measuring a voltage of a unit cell for each battery module.

In the meantime, DC power needs to be supplied to the battery 70. Accordingly, the AC power supplied from the charging device 100 is converted to DC power in an internal charger 62 provided in the vehicle 1 and the DC power is supplied to the battery 70. The internal charger 62 provided in the vehicle 1 is referred to as an on-board charger.

For example, the internal charger 62 may include a power factor correction (PFC) boost converter circuit, a full bridge converter circuit, and a full bridge rectifier circuit. When AC voltage of 200 V is supplied from the common power source through the charging device 100, the PFC boost converter circuit rectifies the AC voltage of 200V and boosts the rectified voltage. The full bridge converter circuit converts the boosted voltage to a high-frequency AC voltage, which is, in turn, transformed by a transformer to a high voltage. The high AC voltage is rectified by the full bridge rectifier circuit; the rectified waveform is converted to a DC voltage by an LC filter circuit; consequently, the DC voltage is charged in the battery 70.

The power supplied from the super charger 3 is DC power, and may be directly supplied to the battery 70 without passing the internal charger 62.

Electrical energy charged in the battery 70 is supplied to the motor 91. Most of parts used in the vehicle 1 operate at a lower voltage, e.g., 12 V. Accordingly, the electrical energy charged in the battery 70 may be converted to a lower voltage by a Low Voltage DC-DC Converter (LDC) 81 before being supplied to the motor 92.

The motor 92 may use a DC motor, an AC motor, a brushless DC (BLDC) motor, or the like, depending on the power in use and the presence of brush. In the present example, it is assumed that the AC motor is used.

An inverter 82 may convert the DC power converted into the lower voltage to AC power, and control the torque of the motor 91 by regulating the voltage and frequency of the AC power.

The motor 91 may be connected to a speed reducer 92. The speed reducer 92 may increase torque by reducing the speed of the motor. With the speed reducer 92, even a small motor may produce significant force, gaining the advantage of cost saving, reduced space, reduced weight, and reduced heat.

The motor 91 generates driving force by converting electrical energy supplied from the battery 70 to torque. The driving force may be transferred to the front wheels 21 or the rear wheels 22 to speed up the vehicle 1.

To slow down or brake the vehicle 1, the motor 91 may act as a generator to generate and store the electrical energy in the battery 70. This is called regenerative braking.

When torque is produced by a current applied to the motor 91, the vehicle 1 may be accelerated, and when the current applied to the motor 91 is cut off, the motor 91 is in a state of closed circuit. If rotors connected to the vehicle wheels 21 and 22 continue to be rotated due to the inertia of the vehicle 1, the motor 91 in the state of closed circuit may generate electrical energy.

The electrical energy generated by the motor 91 corresponds to AC power, and may be converted by the inverter 82 to DC power, which may be, in turn, stored in the battery 70.

The battery controller 61 may optimally maintain the voltage, current, temperature, etc., of the battery 70 by measuring and managing them, and determine a state of charge (SOC) value of the battery 70. The battery controller 61 may further predict a state of health (SOH) of the battery 70, and perform cell balancing to maintain the cells in a uniformly charged state by suppressing overcharging and undercharging of the battery 70. Furthermore, the battery controller 61 may perform thermal management for battery 70 susceptible to heat.

When an electronic control unit (ECU) 53 for performing overall control over the vehicle 1 forwards an acceleration or deceleration command input from the user through an accelerator 52 or a brake 51 to the battery controller 61 in an intra-vehicle communication protocol, the battery controller 61 may control charging or discharging of the battery 70 to supply electrical energy to the motor 91 to accelerate the vehicle 1 or to cut off the electrical energy supplied to the motor 91 to slow down the vehicle 1.

Figure 3:
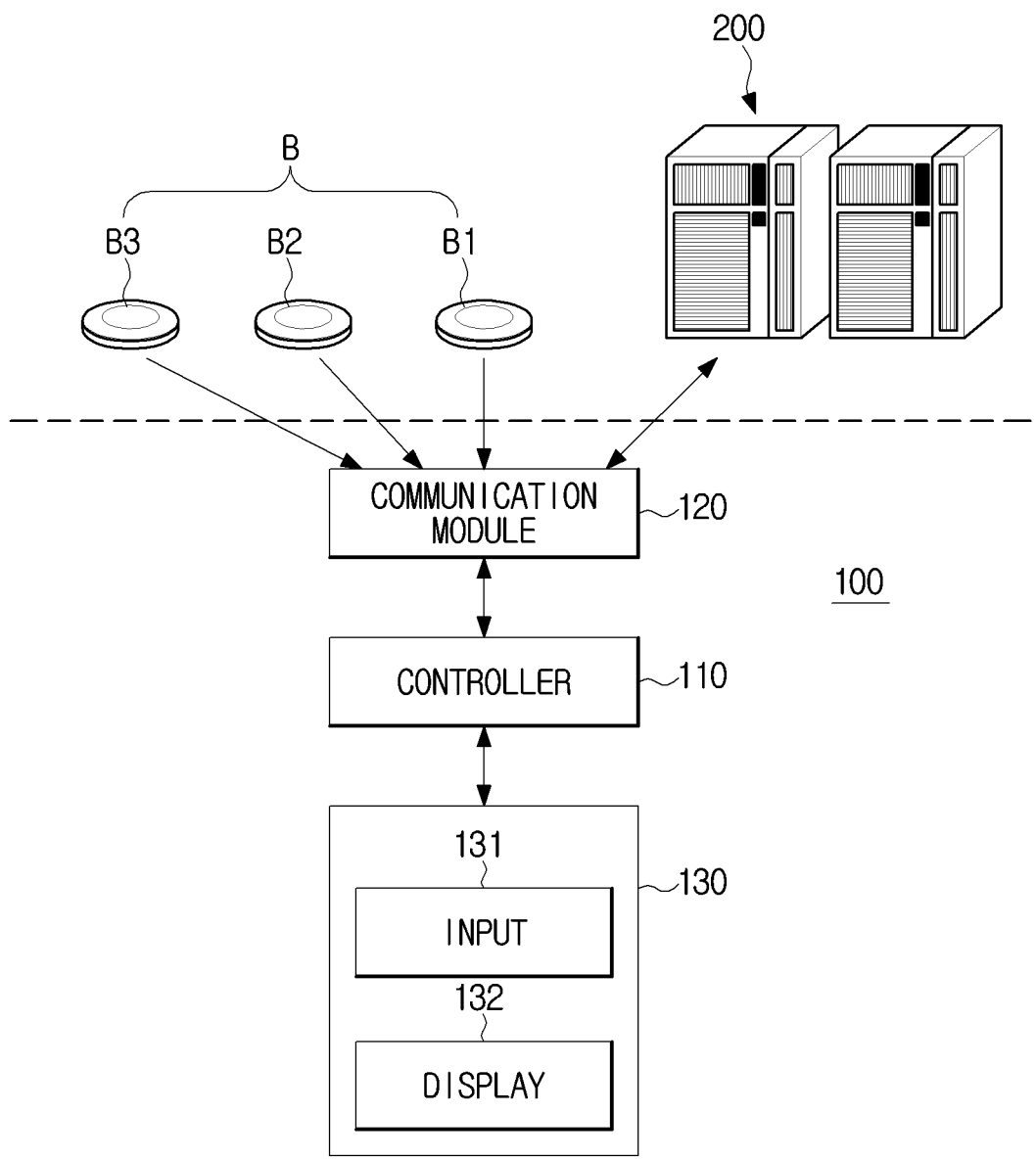
FIG. 3 is a control block diagram of a charging device, according to an exemplary embodiment of the present invention.
Figure 4:
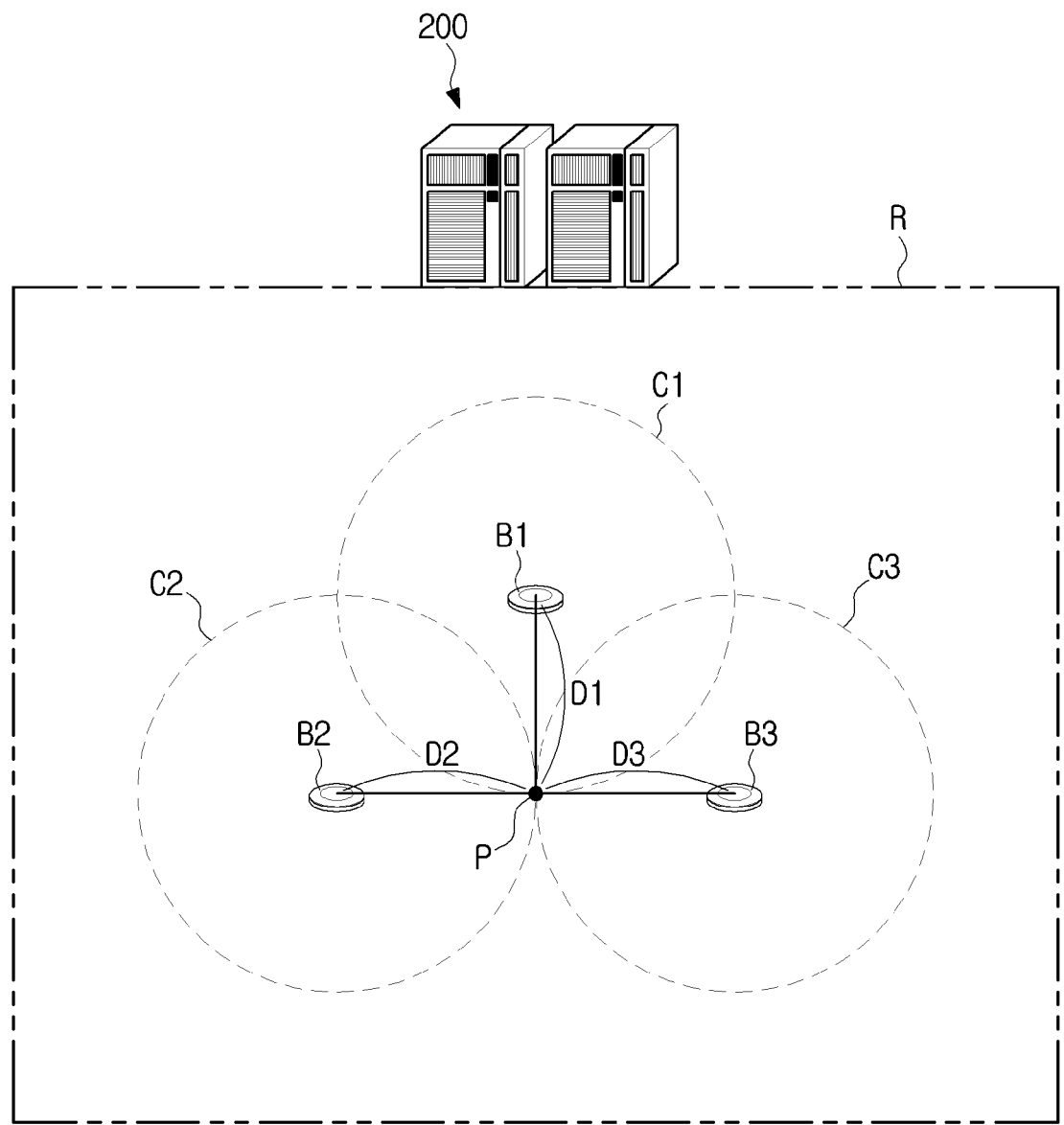
FIG. 4 shows an exemplary beacon used to determine a location of a charging device according to an exemplary embodiment of the present invention.
Figure 5:
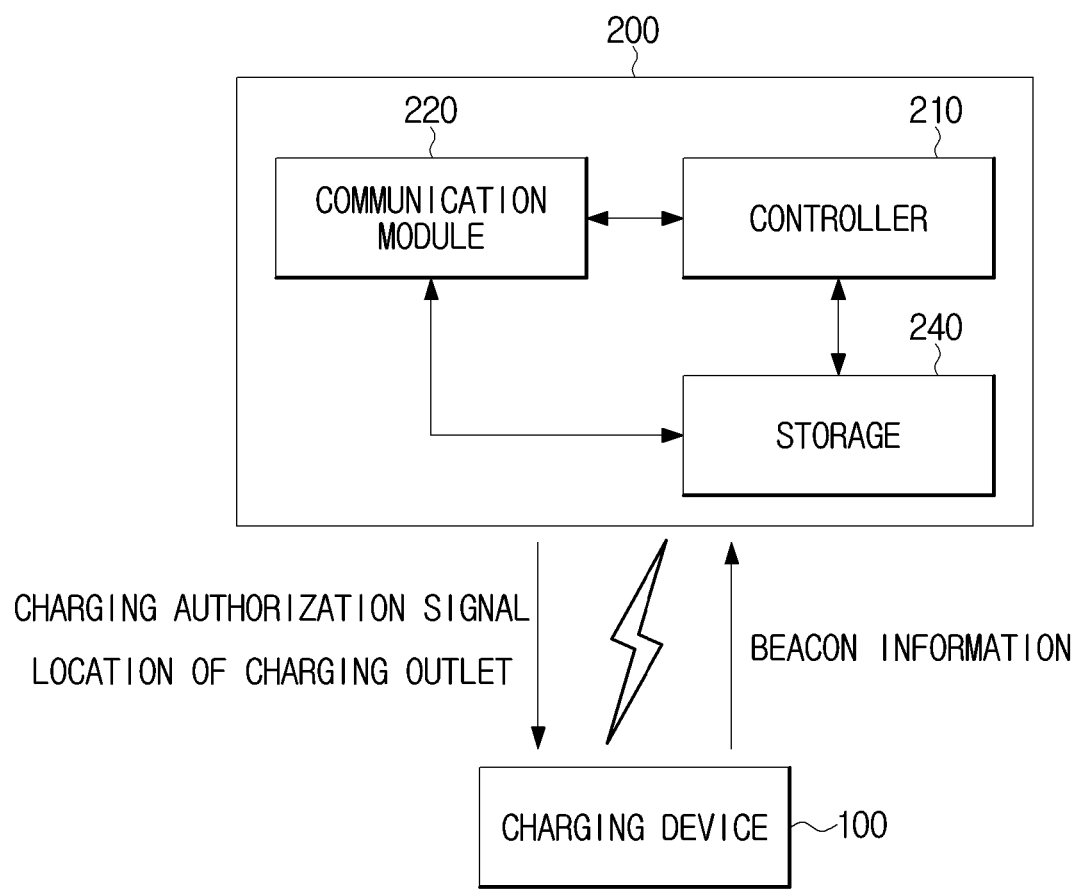
FIG. 5 is a control block diagram of a charging management server, according to an exemplary embodiment of the present invention.

FIG. 3 is a control block diagram of a charging device, according to an exemplary embodiment of the present invention, FIG. 4 shows an exemplary beacon used to determine a location of a charging device according to an exemplary embodiment of the present invention, and FIG. 5 is a control block diagram of a charging management server, according to an exemplary embodiment of the present invention.

Referring to FIG. 3, the charging device 100 includes a communication module 120 for receiving beacon signals including beacon information from a plurality of beacons B: B1, B2, and B3 and transmitting the beacon information included in the received beacon signals to the charging management server 200, and a controller 110 for charging the vehicle 1 connected to the charging connector 101 once a charge authorization signal is received from the charging management server 200, and controlling the communication module 120 to transmit information related to an amount of charging to the charging management server 200.

The charging device 100 may further include a user interface 130 having an input 131 for receiving information related to a desired amount of charging or charging cost from the user and a display 132 for displaying an amount of charging at present or after completion of charging or charging cost based on the amount of charging.

The controller 110 may include at least one memory for storing a program for carrying out the aforementioned and following operations, and at least one processor for executing the program. The at least one memory and the at least one processor may be integrated in a single chip or may be physically separated.

The communication module 120 may include at least one of a wireless communication module and a short range communication module.

The wireless communication module may include at least one of various wireless communication modules which may access the Internet in a wireless communication scheme, such as wireless fidelity (Wi-Fi), wireless broadband (Wibro), global system for mobile communication (GSM), code division multiple access (CDMA), wideband code division multiple access (WCDMA), universal mobile telecommunications system (UMTS), time division multiple access (TDMA), long term evolution (LTE), fourth generation mobile communication, fifth generation mobile communication, etc.

The short-range communication module may include at least one of various short-range communication modules, such as a Bluetooth communication module, a Bluetooth low energy (BLE) communication module, a Wireless Local Access Network (WLAN) communication module, a Zigbee communication module, etc.

A communication module used to receive the beacon signal and a communication module used to communicate with the charging management server 200 may be the same or different communication modules. This will be described in more detail later.

The input 131 of the user interface 130 may be implemented to be operated by the user, such as a button, a touch pad, a jog shuttle, a dial, etc.

The display 132 of the user interface 130 may be implemented by employing one of various display devices configured for displaying test, images, etc., such as liquid crystal display (LCD), light emitting diodes (LEDs), organic LEDs (OLEDs), plasma display panel (PDP), cathode ray tube (CRT), etc.

Referring also to FIG. 4, a plurality of beacons B may be disposed in a certain region managed by the charging management server 200 (hereinafter, called a charging region), and the charging management server 200 may store in advance information related to locations where the plurality of beacons B are disposed.

The charging region R may correspond to the internal to a building including an underground parking lot, an outdoor parking lot, or separate space provided for charging.

The plurality of beacons B disposed in the charging region R may periodically output beacon signals. A beacon corresponds to a kind of signal transmitter for periodically outputting a signal, and beacon information included in the beacon signal may include identification (ID) information and receive signal strength indication (RSSI) information related to the beacon B. The beacon signal is periodically output without any specific receiving target, and thus, also referred to as an advertising signal or broadcast signal.

For example, the ID information related to the beacon may include a universally unique identifier (UUID), a major ID, and/or a minor ID, and may be generated in a form of a Bluetooth packet. The UUID may be a value randomly generated to distinguish the plurality of beacons, the major ID may be used to identify beacons that have the same UUID, and the minor ID may be used to identify beacons that have the same UUID and the same major ID.

When the charging device 100 is located within a range available for transmission of signal, i.e., an output range, the communication module 120 of the charging device 100 may receive the beacon signal output from the beacon B.

As shown in FIG. 4, when the charging device 100 at location P is in the output ranges C1, C2, and C3 of the plurality of beacons B1, B2, and B3 located from the charging device 100 with distances D1, D2, and D3, respectively, the communication module 120 may receive a plurality of beacon signals output from the beacons B1, B2, and B3.

The controller 110 may send the beacon information included in the received plurality of beacon signals to the charging management server 200 through the communication module 120.

The charging management server 200 may manage at least one charging region R. The single charging management server 200 may manage a plurality of charging regions R or a single charging region R. As will be described later, there are no limitations on the location of the charging management server 200 or the location or the number of charging regions R managed by the charging management server 200 as long as the beacons are used for managing charging operation of the charging device 100.

Referring to FIG. 5, a charging management server 200 in accordance with an exemplary embodiment of the present invention may include a communication module 220 for receiving the beacon information from the charging device 100, a controller 210 for determining a location of the charging device 100 based on the received beacon information, and a storage 240 for storing information related to locations of a plurality of beacons.

The controller 210 may include at least one memory for storing a program for carrying out the aforementioned and following operations, and at least one processor for executing the program. The at least one memory and the at least one processor may be integrated on a single chip or may be physically separated. Alternatively, the storage 240, which will be described later, and the memory may be shared.

The communication module 220 may include a wireless communication module facilitating wireless communication with the charging device 100. Furthermore, a short-range communication module may also be included depending on the distance between the charging device 100 and the charging management server 200. The wireless communication module and the short-range communication module are the same as what are described above in connection with the communication module 120 of the charging device 100.

The storage 240 may include a non-volatile memory, such as a read-only memory (ROM), a flash memory, a hard disk, an optical disc drive, etc., and further include a volatile memory as required, such as a dynamic random access memory (DRAM) or static RAM (SRAM).

When the beacon information is received from charging device 100, the controller 210 may determine a location of the charging device 100 based on the information related to locations of the plurality of beacons stored in the storage 230 and the received beacon information.

Turning back to FIG. 4, if the charging device 100 receives beacon signals from three beacons B1, B2, and B3, the controller 210 of the charging management server 200 may determine a distance D1 between beacon 1 (B1) and the charging device 100 based on RSSI of the beacon 1 (B1), a distance D2 between beacon 2 (B2) and the charging device 100 based on RSSI of the beacon 2 (B2), and a distance D3 between beacon 3 (B3) and the charging device 100 based on RSSI of the beacon 3 B3, Furthermore, the controller 210 may determine the location P of the charging device 100 based on the distances D1, D2, and D3 between the charging device 100 and the three beacons B1, B2, and B3.

The storage 240 may store information related to a location of each beacon installed in the charging region R. For example, the storage 240 may match the respective beacon IDs with their location information and store them.

The controller 210 may retrieve ID information included in the beacon information received from the charging device 100 from the storage 240 and obtain the location of a beacon corresponding to the retrieved ID information.

The controller 210 may take the location of the obtained beacon as the center and find the intersection between circles each having the distance between the beacon and the charging device as its radius from the center. For example, the controller 210 may obtain an intersection P between a circle CA1 having the distance D1 between the beacon 1 (B1) and the charging device 100 as its radius from the center, which is the location of the beacon 1 (B1), a circle CA2 having the distance D2 between the beacon 2 (B2) and the charging device 100 as its radius from the center, which is the location of the beacon 2 (B2), and a circle C3 having the distance D3 between the beacon 3 B3 and the charging device 100 as its radius from the center, which is the location of the beacon 3 B3, and may estimate the obtained intersection P as the location of the charging device 100.

The controller 210 may determine whether charging is available, based on the location of the charging device 100. The controller 210 may determine whether the charging device 100 is located near a power source available for charging. The location of the power source available for charging may be defined by a location of a power outlet disposed to supply the power.

The storage 240 may store information related to locations of power outlets available for charging (hereinafter, called charging outlets), and there may be at least one charging outlet in the charging region R. The storage 240 may also store information related to locations of unavailable power outlets for charging. For example, the controller 210 may determine that the charging device 100 is located near a charging outlet, when the charging outlet and the charging device 100 is within a predetermined distance.

The controller 210 may determine that charging is available when the charging device 100 is located near a charging outlet, and transmit a charge authorization signal to the charging device 100 through the communication module 220.

If the charging device 100 is not located near the charging outlet, the controller 210 may determine a location of the nearest charging outlet to the current location of the charging device 100 based on the current location of the charging device 100 and locations of charging outlets.

The controller 210 may provide information related to the location of the nearest charging outlet to the charging device 100 through the communication module 220. For example, the communication module 220 may send the information related to the location of the charging outlet to the charging device 100 or to a mobile device of the user, such as a smart phone, a tablet personal computer (tablet PC), a laptop computer, etc.

In the case of sending the information related to the location of the charging outlet to the user's mobile device, the mobile device may receive the beacon signals, extract the beacon information from the beacon signals, and send the beacon information to the charging management server 200. The charging management server 200 may send the information related to the location of the charging outlet to the mobile device that has sent the beacon information.

A charging program for carrying out the aforementioned operation may be installed in the mobile device, and the charging program may be an embedded program which is installed in the mobile device by default or a third party program which is downloaded from a recording medium included in an external server.

The charging device 100 that has received a charge authorization signal from the charging management server 200 may charge the vehicle 1 by receiving power from an authorized charging outlet.

Figure 6:
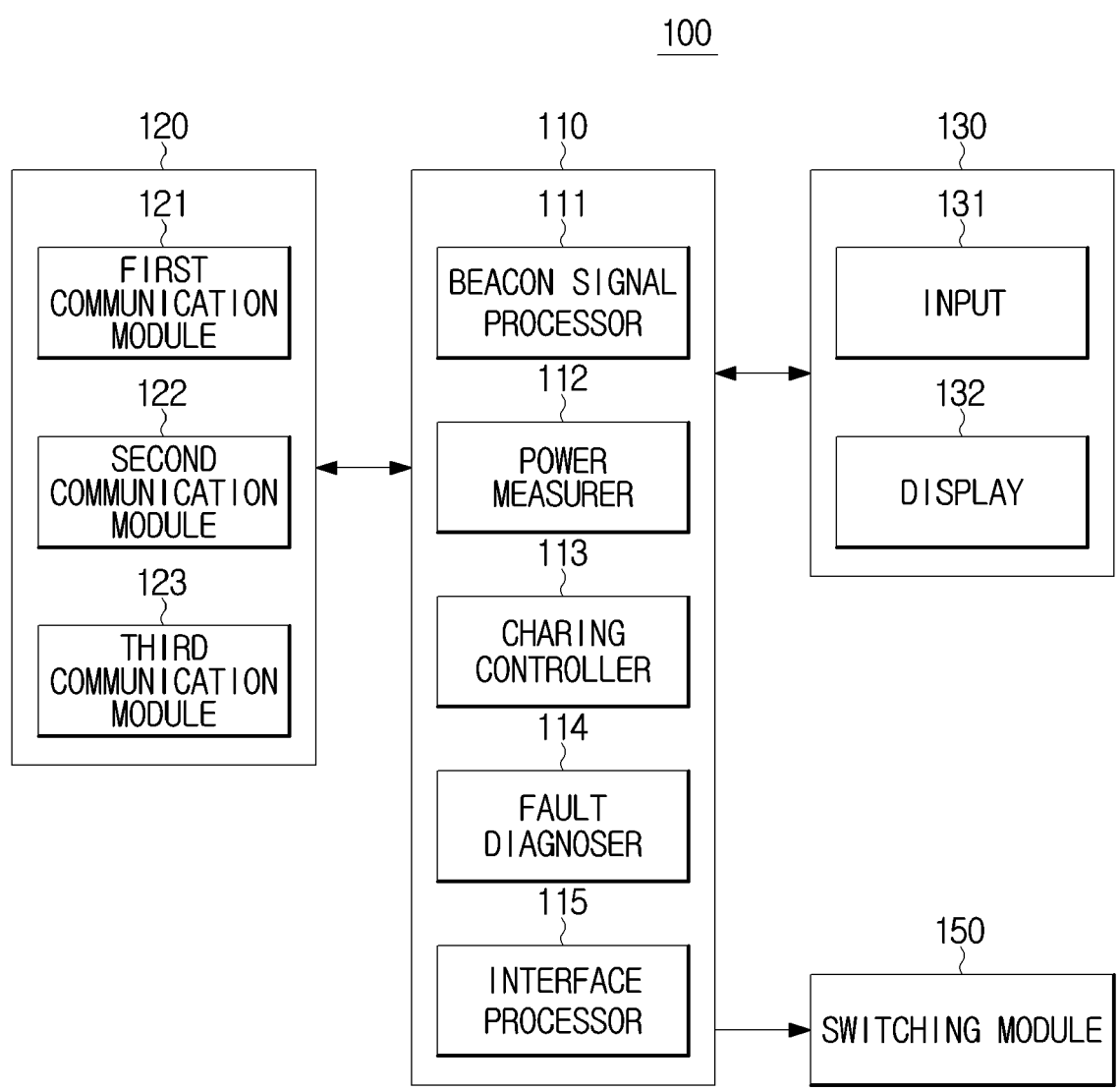
FIG. 6 is a detailed control block diagram of a charging device, according to an exemplary embodiment of the present invention.

FIG. 6 is a detailed control block diagram of a charging device, according to an exemplary embodiment of the present invention.

Referring to FIG. 6, the controller 110 may include a beacon signal processor 111 for processing the received beacon signals to extract beacon information, a power measurer 112 for measuring an amount of charging, a charging controller 113 for controlling charging of the vehicle 1, a fault diagnoser 114 for detecting fault conditions which may occur during charging, and an interface processor 115 for processing a user command input to the input 131 and providing information required for the user through the display 132.

The communication module 120 may include a first communication module 121 for receiving beacon signals, a second communication module 122 for communicating with the charging management server, and a third communication module 123 for communicating with the vehicle 1.

For example, the first communication module 120 may use the Bluetooth communication scheme, the second communication module 122 may use the Wi-Fi communication scheme, and the third communication module 123 may use the International Organization for Standardization/International Electro technical Commission (ISO/IEC) 15118, which is a communication protocol for the electric vehicle and the charging device to exchange data.

The charging device 100 may further include a switching module 150 for applying or cutting off the power to the vehicle 1.

It is not necessary to physically separate the beacon signal processor 111, the power measurer 112, the charging controller 113, the fault diagnoser 114, and the interface processor 115 included in the controller 110, and it is possible to share one or more processors and memories.

Referring to the aforementioned arrangement of the charging device 100 and the charging management server 200 and FIGS. 7 and 8, a procedure in which the charging device 100 charges the vehicle 1 will now be described in detail.

Figure 7:
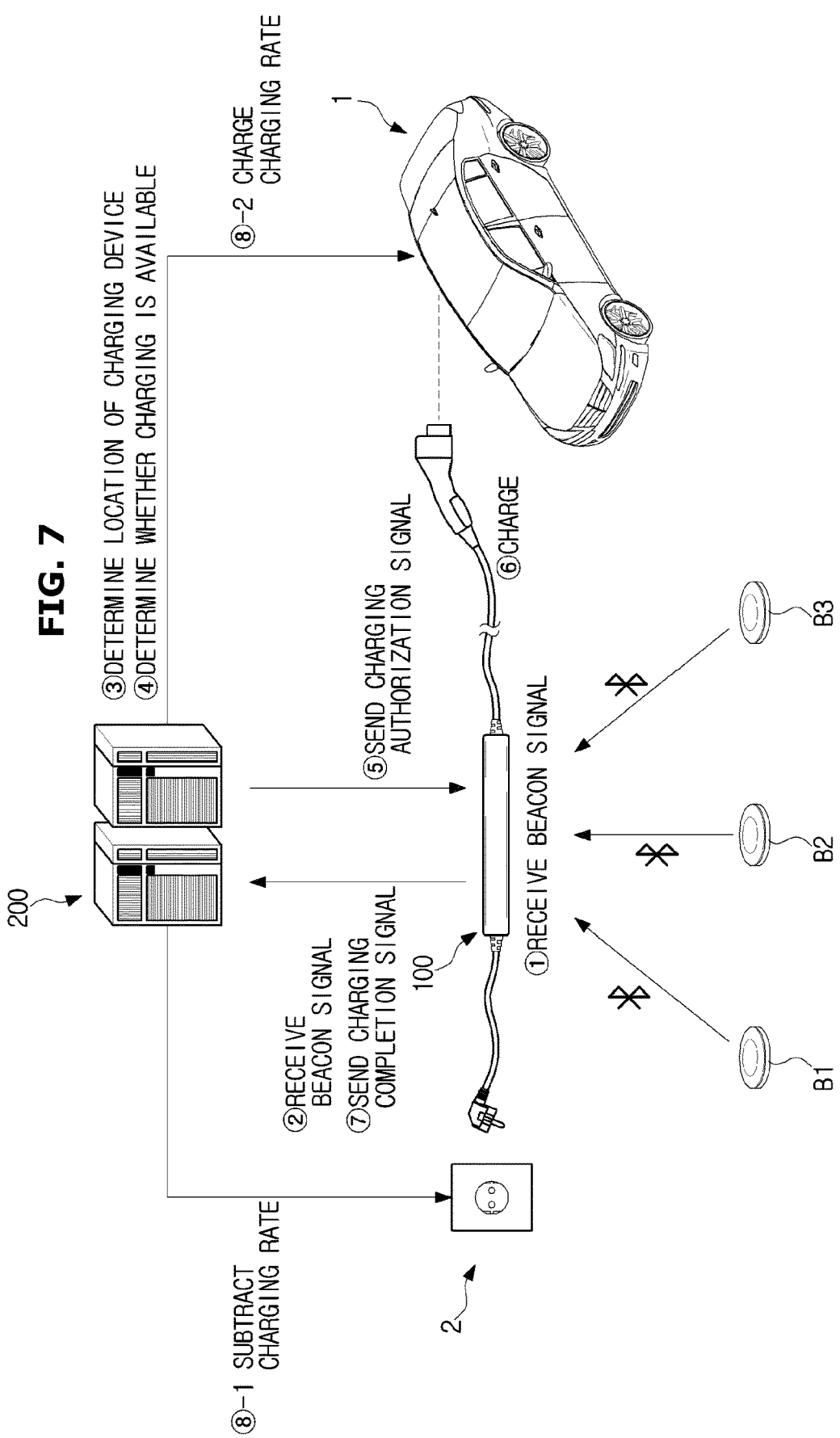
FIG. 7 shows an exemplary procedure of charging a vehicle while a charging device and a charging management server are exchanging signals with each other, according to an exemplary embodiment of the present invention.
Figure 8:
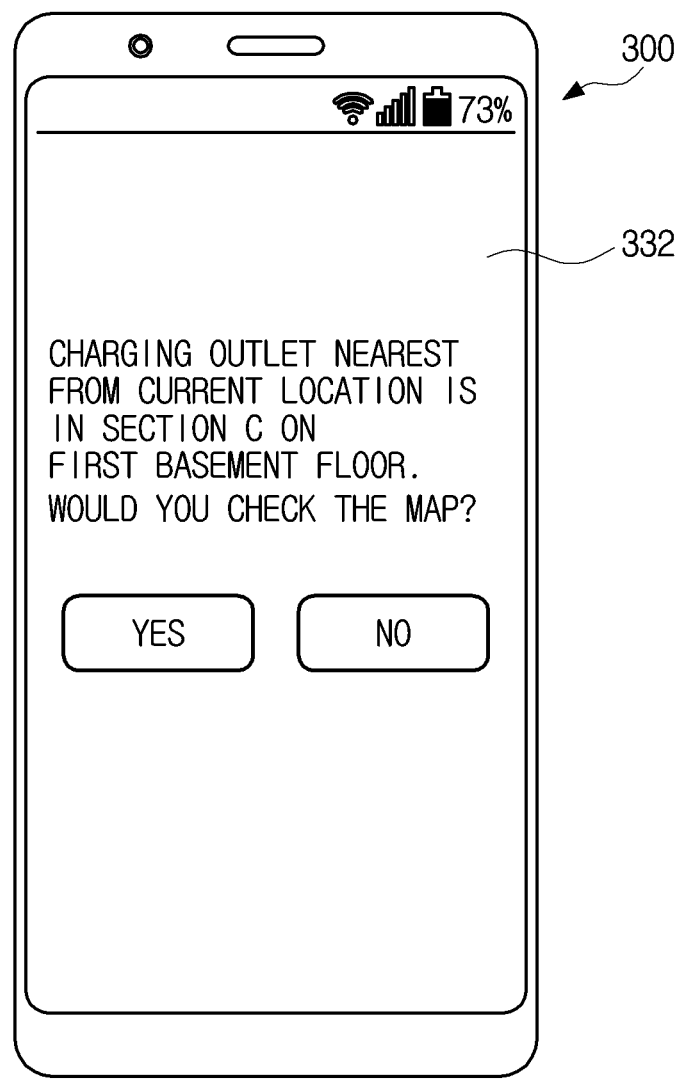
FIG. 8 shows a mobile device configured for displaying location information related to a power outlet for charging provided by a charging management server according to an exemplary embodiment of the present invention.

FIG. 7 shows an exemplary procedure of charging a vehicle while a charging device and a charging management server are exchanging signals with each other, according to an exemplary embodiment of the present invention, and FIG. 8 shows a mobile device configured for displaying location information related to a power outlet for charging (a charging outlet) provided by a charging management server according to an exemplary embodiment of the present invention.

Referring to FIG. 7, the plurality of beacons B1, B2, and B3 periodically output beacon signals, and when the charging device 100 is in the output range of the beacons, the communication module 120 of the charging device 100 may receive the respective beacon signals from the plurality of beacons B1, B2, and B3 ①. For example, the first communication module 121 using the Bluetooth communication scheme may receive the beacon signals.

The controller 110 extracts beacon information included in the beacon signal, and sends the extracted beacon information to the charging management server 200 through the communication module 120 ②. For example, the beacon signal processor 111 may decode a beacon signal in a form of a Bluetooth packet and obtain the beacon information included in the beacon signal, such as beacon ID information, RSSI information, etc.

The second communication module 122 may send the beacon information to the charging management server 200 through the Wi-Fi communication scheme, and the communication module 220 of the charging management server 200 may receive the beacon information.

The controller 210 of the charging management server 200 determines the location of the charging device 100 based on the received beacon information ③. As described above, the storage 240 of the charging management server 200 may store the respective location information related to beacons disposed in the charging region R, and the controller 210 may retrieve ID information included in the beacon information received from the charging device 100 from the storage 240 and obtain the location of a beacon corresponding to the retrieved ID information. Furthermore, the controller 210 may determine the location of the charging device 100 using the locations of the plurality of beacons B1, B2, and B3 and distances from the respective beacons to the charging device 100.

The controller 210 determines whether charging is available based on the location of the charging device 100 ④. For example, the controller 210 may determine whether the charging device 100 is located near the charging outlet based on the location of the charging device 100 and location information related to the charging outlets stored in the storage 240. The controller 210 may determine that the charging device 100 is located near a charging outlet when the charging device 100 is within a predetermined radius from the charging outlet.

When the charging device 100 is located near the charging outlet, the controller 210 sends a charge authorization signal to the charging device 100 through the communication module 220 ⑤.

Furthermore, if it is determined that there are many vehicles being charged in the charging region R, e.g., if the controller 210 determines that a predetermined number of or more than the predetermined number of vehicles are being charged, the charging management server 200 may send recommended maximum charging current information to the charging device 100 and thus, guide the user to charge the vehicle 1 at the recommended maximum charging current.

The second communication module 122 of the charging device 100 may receive the information related to a recommended maximum charging current from the charging management server 200, and the interface processor 115 may control the display 132 to display the recommended maximum charging current.

In the meantime, if the charging device 100 is not located near the charging outlet, the controller 210 may determine where the nearest charging outlet to the current location of the charging device 100 is and provide the information related to the nearest charging outlet to the user.

Referring to FIG. 8, when the controller 210 sends information related to the location of a charging outlet to a mobile device 300, the mobile device 300 may output a screen on a display 332 indicating the charging outlet which is nearest to the current location. As described above, the user's mobile device 300 may also inform the charging management server 200 of the location of the mobile device 300 in a way of receiving beacon signals from the beacons B, extracting the beacon information from the received beacon signals, and sending the beacon information to the charging management server 200.

It is also possible to send the information related to the location of a charging outlet to the charging device 100. When the second communication module 122 of the charging device 100 receives information related to the location of a charging outlet, the interface processor 115 may control the display 132 to display the visual information related to the location of the charging outlet.

When the second communication module 122 of the charging device 100 receives a charge authorization signal, the controller 110 starts charging the vehicle 1 ⑥. For example, the charging controller 113 may control the switching module 150 and the third communication module 123 to start charging the vehicle 1. The switching module 150 may include a relay which is turned on or off to enable or disable supply of power. The charging controller 113 may transfer the power supplied through the charging outlet by turning on the relay, and receive information related to an SOC value of the vehicle 1 by communicating with the vehicle 1 through the third communication module 123.

If the charge authorization signal is received from the charging management server 200 but the connector 101 or 103 of the charging cable Ca1 is not connected to the charging port 41 of the vehicle 1 or the charging outlet, the controller 110 may output a message to connect the connector 101 or 103 through the user interface 130.

Once charging is started, the fault diagnoser 114 may detect fault conditions which may occur during the charging, and may send a warning signal for the charging controller 113 to stop charging if a fault condition has occurred or there is a possible risk of a fault condition.

Upon reception of the warning signal, the charging controller 113 may stop charging by controlling the switching module 150 to cut off power.

The power measurer 112 measures power supplied to the vehicle 1 from a power source through the charging outlet. In various exemplary embodiments of the present invention, it is also possible to send the charging management server 200 charging data including information like a measured amount of power in real time, or to send a total amount of power used for charging after completion of the charging to the charging management server 200.

The interface processor 115 may control the display 132 to display the information related to the amount of power measured by the power measurer 112.

The communication module 120 may receive beacon signals for the charging device 100 in real time even after receiving the charge authorization signal from the charging management server 200 and send the beacon information to the charging management server 200. For example, when the charging device 100 is moved to an unauthorized power outlet other than an authorized charging outlet after charging is authorized, the charging management server 200 may withdraw the charge authorization.

After completion of charging, the communication module 120 sends a charging completion signal to the charging management server 200 ⑦. For example, the charging controller 113 may determine whether the charging is completed. It may be determined that charging is completed if the information related to an SOC value of the vehicle 1 received through the third communication module 123 indicates that charging of the battery 70 is completed or that the amount of charging input by the user is met. In the latter case, the user may input a target amount of charging or target cost of charging through the input 131 before charging is started. The interface processor 115 may send the information related to the amount of charging for the charging controller 113 to deal with the user's input and supply as much power as the target amount of charging or target cost of charging input by the user.

When the second communication module 122 sends the charging completion signal to the charging management server 200, it may also send information related to the total amount of power measured by the power measurer 112, i.e., the amount of power actually used for charging.

The controller 210 of the charging management server 200 determines a charging cost based on the information related to the amount of transmitted power, subtracts the charging cost from an electricity bill that the owner of the charging power source 2 has to pay ⑧-1, and charges the owner of the vehicle 1 for the charging cost ⑧-2. Alternatively, subtraction of the charging cost may include subtracting an amount of power used for charging the vehicle 1 from an amount of power used by the owner of the charging power source 2.

How to charge for the charging cost may vary depending on who operates the charging management server 200. If the operator of the charging management server 200 has no right to directly charge an electricity bill, the charging management server 200 may send information related to a charging cost that the owner of the vehicle 1 has to pay and a charging cost to be subtracted from the electricity bill of the owner of the charging power source 2 to a server that manages electricity bills.

Figure 9:
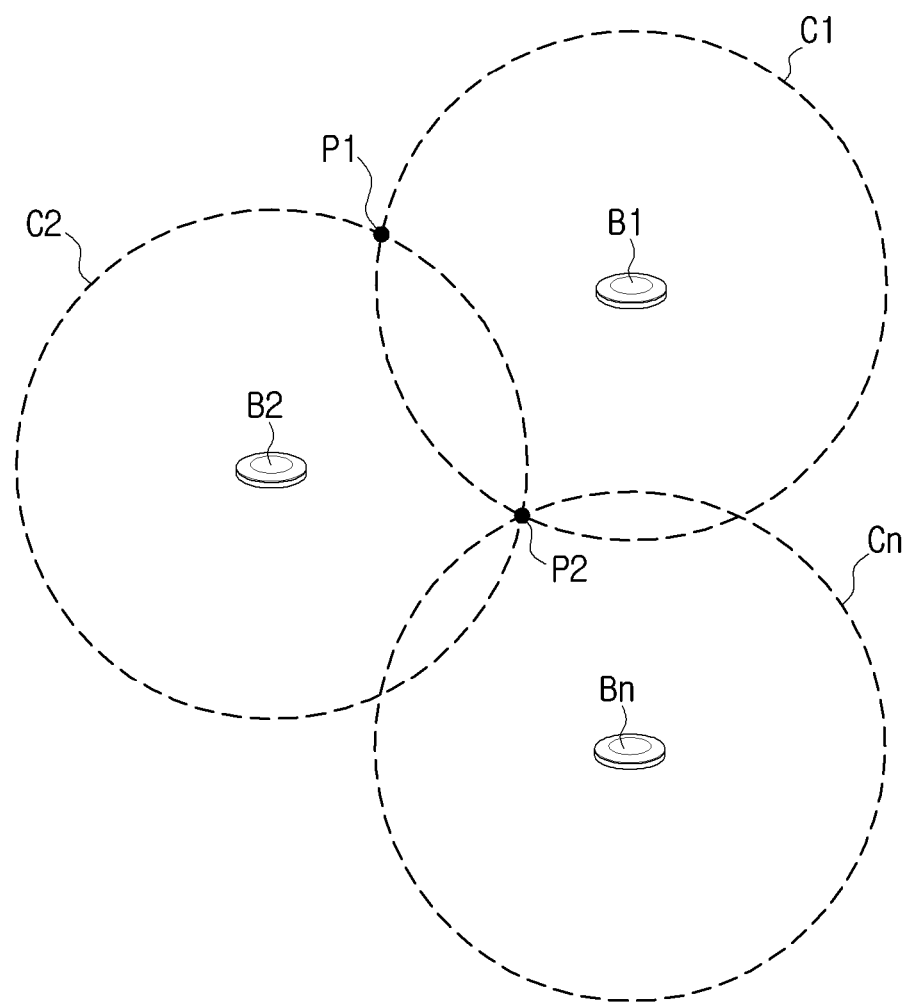
FIG. 9 is a diagram for explaining operation of a charging management server determining a location of a charging device according to an exemplary embodiment of the present invention when receiving of three or more beacon signals is unavailable.

FIG. 9 is a diagram for explaining operation of a charging management server determining a location of a charging device according to an exemplary embodiment of the present invention when receiving of three or more beacon signals is unavailable.

If the charging device 100 receives only the beacon signals from the beacon 1 (B1) and beacon 2 (B2), the charging management server 200, upon reception of the beacon information from the charging device 100, may first determine the location of the charging device 100 based on the beacon information related to the beacon 1 (B1) and the beacon information related to the beacon 2 (B2).

For example, the controller 210 may determine that the charging device 100 is located at one of the two intersections P1 and P2 between the circle CA1 having the distance D1 from the beacon 1 (B1) to the charging device 100 as its radius from the center, which is the location of the beacon 1 (B1), and the circle CA2 having the distance D2 from the beacon 2 (B2) to the charging device 100 as its radius from the center, which is the location of the beacon 2 (B2).

The controller 210 may determine whether charging is available only based on the two pieces of beacon information, and may send a charge authorization signal to the charging device 100 if it is determined that charging is available, as described above.

If it is determined that the location of the charging device 100 may not be identified from the two pieces of beacon information, the controller 210 may use a beacon signal output from a beacon Bn located in a different region such as in a neighboring building or the RSSI of the second communication module 122 to form a circle Cn, and determine the location of the charging device 100 based on the circle Cn. When it is possible to identify the location of the charging device 100, the charge authorization signal may be sent to the charging device 100.

If the location of the charging device 100 may not be identified even with the RSSI of the second communication unit 122 or the beacon signal from a different region, a charge prohibition message may be sent to the charging device 100.

A charging method in accordance with an exemplary embodiment will now be described. For the charging method, the charging device 100 or the charging management server 200 as described above may be used. Accordingly, what are described above with reference to FIGS. 1 to 9 may also be applied in the charging method without being specifically mentioned.

Figure 10:
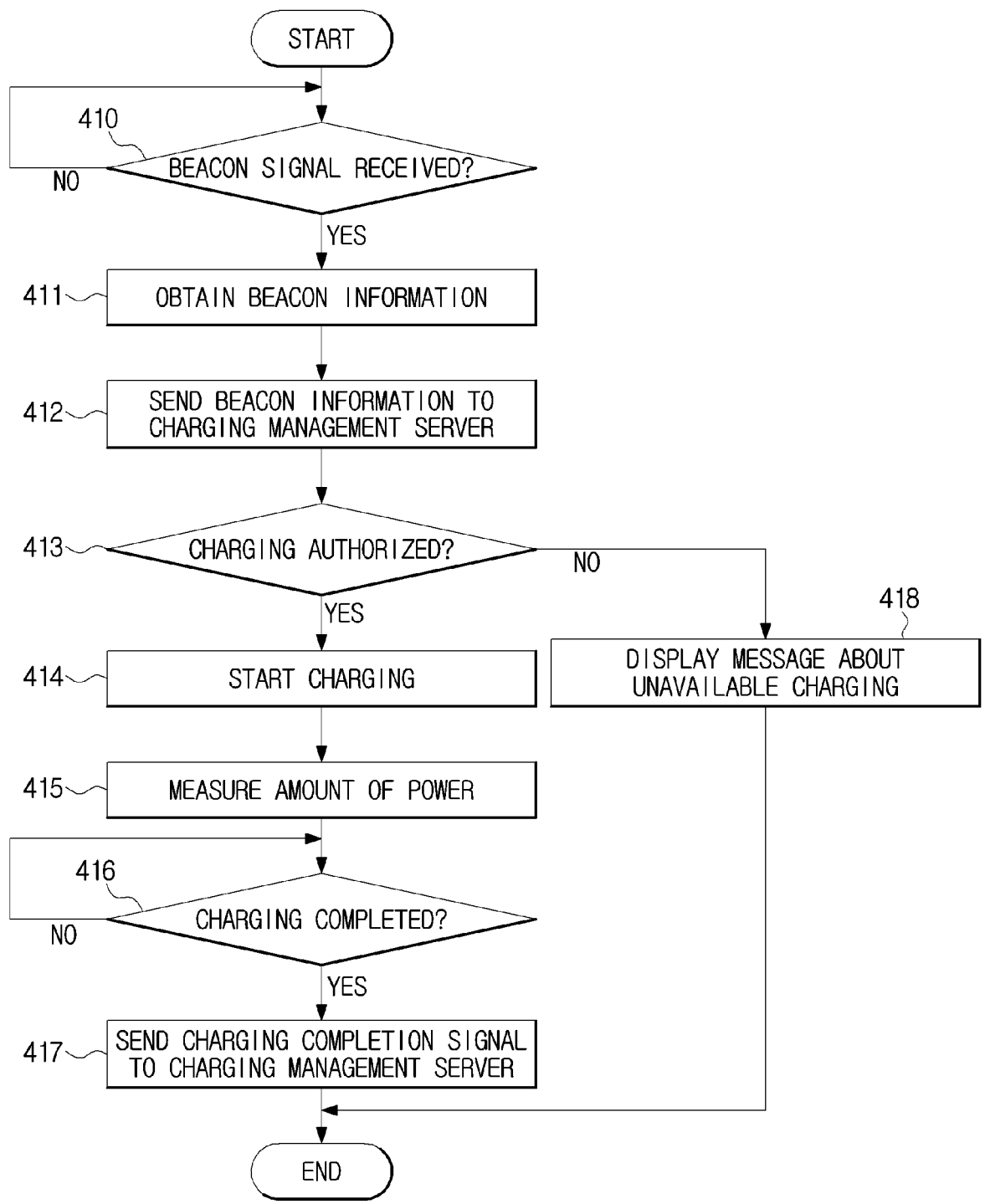
FIG. 10 is a flowchart illustrating a charging method, according to an exemplary embodiment of the present invention.

FIG. 10 is a flowchart illustrating a charging method, according to an exemplary embodiment of the present invention. The charging method of FIG. 10 may be performed by the charging device 100.

In the charging method of FIG. 10, when the communication module 120 of the charging device 100 receives beacon signals from neighboring beacons B in 410, the controller 110 obtains beacon information from the received beacon signals, in 411. For example, the controller 110 may decode a beacon signal in a form of a Bluetooth packet and obtain the beacon information included in the beacon signal, such as beacon ID information, RSSI information, etc.

The communication unit 120 sends the beacon information to the charging management server 200, in 412. The communication scheme used to receive the beacon signal may be the same as or different from the communication scheme used to send the beacon information to the charging management server 200.

As described above, the charging management server 200 may determine the location of the charging device 100 based on the beacon information sent from the charging device 100 and determine whether to authorize charging based on the location of the charging device 100.

If the communication module 120 receives the charging authorization signal from the charging management server 200 in 413, the controller 110 may control the switching module 150 to initiate charging by transferring the power supplied from the charging power source connected through the charging outlet to the vehicle 1, in 414.

Otherwise, if the charging authorization signal is not received from the charging management server 200 in 413, a charging prohibition message may be displayed on the display 132 in 418. It is also possible to receive information related to the location of a power source available for charging from the charging management server 200 and display the information on the display 132.

While the charging process is underway, the controller 110 may measure the power supplied to the vehicle 1 from the charging power source, in 415. The measured power may be sent to the charging management server 200 in real time, or displayed on the display 132.

When the charging is completed in 416, a charging completion signal is sent to the charging management server, in 417. The controller 110 may determine that charging is completed if the information related to an SOC value of the vehicle 1 received through the communication module 120 indicates that charging of the battery 70 is completed or that the amount of charging input by the user is met. In the latter case, the user may input a target amount of charging or target cost of charging through the input 131 before charging is started.

Figure 11:
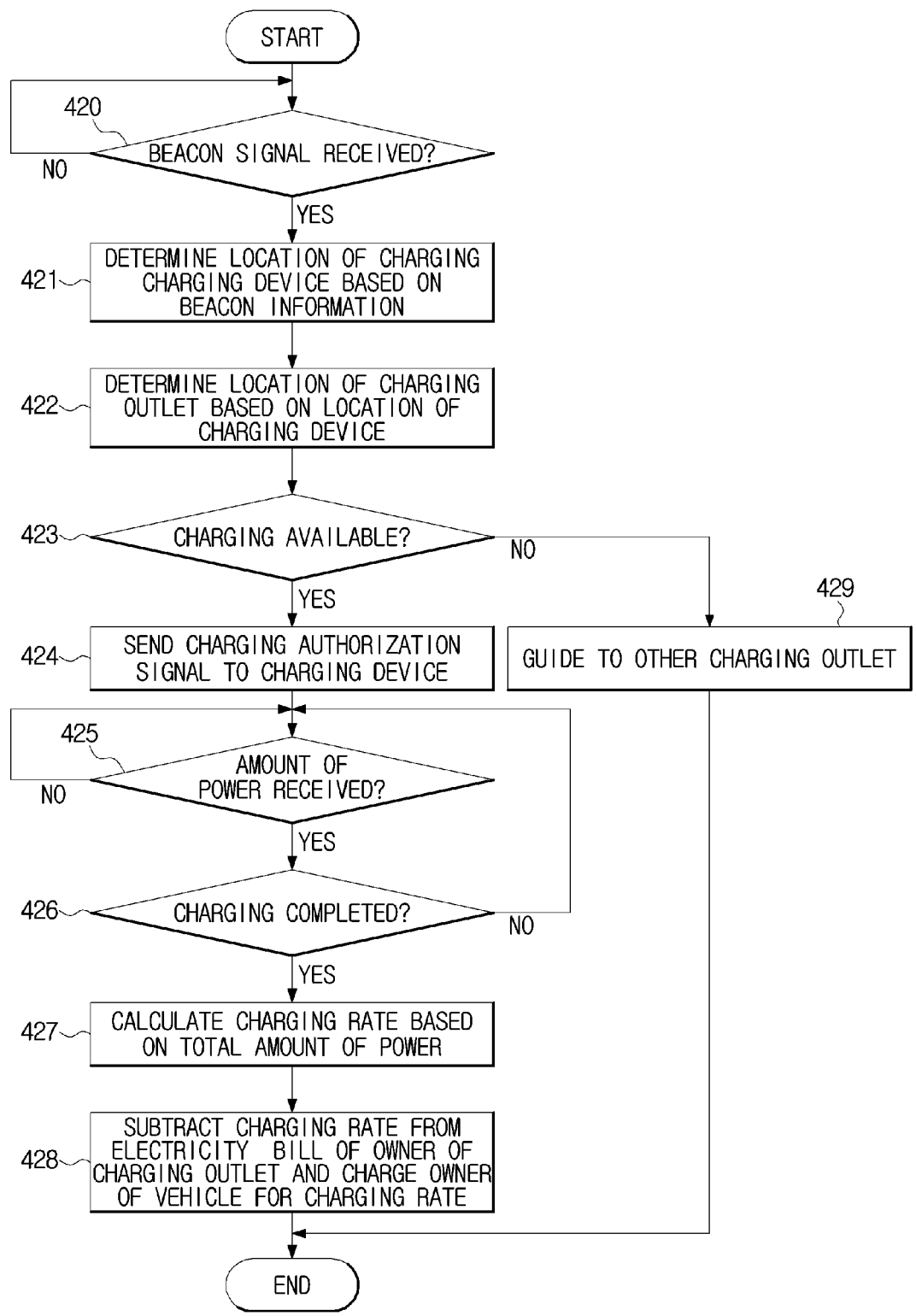
FIG. 11 is a flowchart illustrating a charging method performed by a charging management server, according to an exemplary embodiment of the present invention.

FIG. 11 is a flowchart illustrating a charging method performed by a charging management server, according to an exemplary embodiment of the present invention.

In the charging method of FIG. 11, when the communication module 220 of the charging management server 200 receives beacon information from the charging device 100 in 420, the controller 210 determines the location of the charging device 100 based on the beacon information, in 421. The storage 240 may store information related to a location of each beacon disposed in the charging region R. The controller 210 may retrieve ID information included in the beacon information received from the charging device 100 from the storage 240 and obtain the location of a beacon corresponding to the retrieved ID information. The controller 210 may determine the location of the charging device 100 by taking the location of the obtained beacon as the center and using the intersection between circles each having the distance between the beacon and the charging device 100 as its radius from the center.

The controller 210 may determine the location of a charging outlet based on the location of the charging device 100, in 422. The controller 210 may determine whether the charging device 100 is located near the charging outlet, and if the charging device 100 is not located near the charging outlet, even determine a location of the nearest charging outlet to the current location of the charging device 100.

It is determined that charging is available when the charging device 100 is located near a charging outlet, in 423, and the communication module 220 may send the charging authorization signal to the charging device 100.

As described above, the charging device 100, upon reception of the charging authorization signal, may charge the vehicle 1 and measure an amount of power used for charging. The measured amount of power may be sent to the charging management server 200.

After receiving the amount of power in 425 and charging completion signal in 426, the controller 210 determines a charging cost based on the total amount of power used for charging, in 427.

The charging cost is subtracted from an electricity bill of the owner of the charging outlet, and charged from the vehicle owner, in 428.

According to an exemplary embodiment of the present invention, a charging device, charging management server, and charging method enables the charging management server to determine a correct current location by sending received beacon signals to the charging management server and enables a precise bill to be charged by sending information related to an amount of charging to the charging management server after the charging is started.

It may also prevent wrong use of public electricity by allowing charging when the use of power at the current location is authorized from the charging management server.

According to exemplary embodiments of the present invention, electric vehicles or plug-in hybrid vehicles may be conveniently charged and unauthorized use of public electricity may be prevented by determining the current location of the charging device based on beacon signals received from the charging device, guiding the user to a power source available for charging, allowing the user to charge electricity, and charging the user for the electricity charging based on the current location of the charging device.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A charging device comprising:
   a charging connector connectable to a vehicle;
   a power connector connectable to a power source;
   a communication module configured to receive beacon signals from a plurality of beacons and send identification (ID) information and received signal strength indication (RSSI) information included in the received beacon signals to a charging management server; and
   a controller configured to, upon reception of a charging authorization signal from the charging management server, charge the vehicle connected to the charging connector and control the communication module to send information related to an amount of power used for charging the vehicle to the charging management server,
   wherein the charging authorization signal is a signal received from the charging management server when it is determined by the charging management server that a location of the charging device is within a predetermined radius from the power source, and
   wherein the location of the charging device is obtained by the identification (ID) information and the received signal strength indication (RSSI) information included in the received beacon signals.

2. The charging device of claim 1, wherein the controller is configured to determine the amount of power used for charging the vehicle.

3. The charging device of claim 2, wherein the communication module is configured to send a charging completion signal to the charging management server when the charging of the vehicle is completed.

4. The charging device of claim 2, wherein the communication module is configured to send a charging completion signal and information related to a total amount of power used for charging to the charging management server when the charging of the vehicle is completed.

5. The charging device of claim 2, wherein the controller is configured to determine that the charging is completed when information related to a state of charge (SOC) received from the vehicle indicates that charging a battery of the vehicle is completed.

6. The charging device of claim 2, further including:
   an input configured to receive information related to an amount of charging or a charging cost from a user.

7. The charging device of claim 6, wherein the controller is configured to determine whether the charging is completed based on the amount of charging or the charging cost input to the input.

8. The charging device of claim 1, further including:
   a display configured to display information related to a location of a charging outlet, which is nearest to a current location of the charging device, when the communication module receives the information related to the location of the charging outlet from the charging management server.

9. A charging management server comprising:
   a communication module configured to receive a plurality of pieces of beacon information from a charging device;
   a storage configured to store locations of a plurality of beacons corresponding to identification (ID) information of the plurality of beacons, respectively; and
   a controller configured to identify the identification (ID) information and receive signal strength indication (RSSI) information of the plurality of beacons based on the received plurality of pieces of beacon information, obtain a location of the charging device based on the identification (ID) information and the receive signal strength indication (RSSI) information of the plurality of beacons, determine whether the charging device is located within a predetermined radius from a charging outlet based on the obtained location of the charging device and a predetermined location of the charging outlet, and when it is determined that the charging device is located within the predetermined radius from the charging outlet, and control the communication module to send a charging authorization signal to the charging device.

10. The charging management server of claim 9, wherein the controller is configured to control the communication module to send information related to the predetermined location of the charging outlet to the charging device when determining that the charging is unavailable.

11. The charging management server of claim 9, wherein the controller is configured to determine a charging cost based on information related to an amount of power used for charging when the communication module receives a charging completion signal and information related to an amount of power used for charging from the charging device.

12. The charging management server of claim 11, wherein the controller is configured to subtract the charging cost from an electricity bill of an owner of the charging device.

13. The charging management server of claim 11, wherein the controller is configured to charge an owner of the vehicle for the charging cost.

14. The charging management server of claim 9, wherein the controller is configured to control the communication module to send information related to a recommended maximum charging current to the charging device when determining that a predetermined number or more of vehicles are currently being charged.

15. A charging method comprising:
    receiving beacon signals from a plurality of beacons;
    obtaining a plurality of pieces of identification (ID) information and receive signal strength indication (RSSI) information from the beacon signals;
    sending identification (ID) information and the received signal strength indication (RSSI) information included in the beacon signals to a charging management server of a charging device;
    charging, by a controller, a vehicle connected to a charging connector when a charging authorization signal is received, by the controller, from the charging management server; and
    sending, by the controller, information related to an amount of power used for charging the vehicle to the charging management server,
    wherein the charging authorization signal is a signal received from the charging management server when it is determined by the charging management server that a location of the charging device is within a predetermined radius from a power source, and
    wherein the location of the charging device is obtained by the identification (ID) information and the received signal strength indication (RSSI) information included in the received beacon signals.

16. The charging method of claim 15, further including:
    measuring an amount of power used for the charging the vehicle.

17. The charging method of claim 16, further including:
    sending a charging completion signal to the charging management server when the charging of the vehicle is completed.

18. The charging method of claim 16, further including:
    determining whether the charging of the vehicle is completed.

19. The charging method of claim 18, wherein the determining of whether the charging of the vehicle is completed includes:
    determining that the charging is completed when information related to a state of charge (SOC) value received from the vehicle indicates that charging a battery of the vehicle is completed.

20. The charging method of claim 18, further including:
    receiving information related to an amount of charging or a charging cost from a user.

21. The charging method of claim 20, wherein the determining of whether the charging of the vehicle is completed includes:
    determining whether the charging is completed based on an amount of the charging or the charging cost input.

22. The charging method of claim 18, further including:
    displaying information related to a location of a charging outlet, which is nearest to a current location of the charging device, when the information related to the location of the charging outlet is received from the charging management server.

* * * * *